United States Patent [19]

Kimura

[11] Patent Number: 5,014,960
[45] Date of Patent: May 14, 1991

[54] FORE-AND-AFT SUSPENSION DEVICE FOR AUTOMOTIVE SEAT

[75] Inventor: Takeo Kimura, Akishima, Japan

[73] Assignee: Tachi-S Co., Ltd., Tokyo, Japan

[21] Appl. No.: 253,433

[22] Filed: Oct. 5, 1988

[30] Foreign Application Priority Data

Mar. 13, 1988 [JP] Japan .................. 63-43713

[51] Int. Cl.⁵ ............................................. F16M 13/00
[52] U.S. Cl. .................................. 248/602; 248/419; 248/420
[58] Field of Search ............... 248/602, 583, 298, 419, 248/420; 267/70, 75, 174

[56] References Cited

U.S. PATENT DOCUMENTS

| 1,133,315 | 3/1915 | Pelton | 267/75 |
| 1,243,526 | 10/1917 | Hughes et al. | 267/70 X |
| 1,384,576 | 7/1921 | Suhr | 248/602 |
| 1,495,287 | 5/1924 | Wilson | 248/602 |
| 2,383,173 | 8/1945 | Watter | 248/419 X |
| 2,859,710 | 11/1958 | Elsner | 248/298 X |
| 2,976,005 | 3/1961 | Stell | 248/298 |
| 2,983,307 | 5/1961 | Meyer | 248/419 |
| 3,075,736 | 1/1963 | Freedman | 248/419 X |
| 3,356,331 | 12/1967 | Springuel | 248/602 |
| 3,877,670 | 4/1975 | Findley et al. | 248/298 |

FOREIGN PATENT DOCUMENTS 54-95406 7/1979 Japan .
54-125047 9/1979 Japan .

Primary Examiner—Ramon S. Britts
Assistant Examiner—David G. Kolman
Attorney, Agent, or Firm—Browdy and Neimark

[57] ABSTRACT

A fore-and-aft suspension device for an automotive seat, in which the seat lower base frame of said seat is movable forwardly and backwardly along a guide rail, and a shaft extends between the seat lower base frame and guide rail, with a pair of coil springs being wound around the shaft. A spring abutment member is also provided between the seat lower base frame and guide rail, such that those coil springs are at their respective ends abutted against both sides of the spring abutment member. Thus, a forward and backward load or jolting applied to the seat is smoothly transmitted, via such seat lower base frame, to the the coil springs, which are then compressed at the spring abutment member, absorbing the forward and backward load or jolting.

5 Claims, 4 Drawing Sheets

FORE-AND-AFT SUSPENSION DEVICE FOR AUTOMOTIVE SEAT

BACKGROUND OF THE INVENTION

1. Field of the Invention

The present invention relates to a fore-and-aft suspension device for use in an automotive seat, which is designed to absorb a horizontal forward/backward load, impact or jolting applied to the seat in its longitudinal direction, as opposed to an ordinary vertically operable seat suspension device.

2. Description of the Prior Art

It has been known that a horizontal forward/backward load, impact or jolting applied to a seat during driving an automobile is absorbed by use of a fore-and-aft suspension device, in contrast to an ordinary seat suspension device for absorbing a vertically applied load or jolting. Among various hitherto such fore-and-aft suspension devices, the following two prior arts indicate a basic technical concept for absorbing a horizontal forward/backward load or jolting exerted on the seat: the Japanese Laid-Open Publication Nos. 54-125047 and 54-95406. According to them, there is basically disclosed a structure wherein a pair of spaced-apart coil spirngs are wound around a horizontal shaft, an upper bracket fixed to the seat, the upper bracket being fixed to both ends of the horizontal shaft, and at the midway point of the shaft, a shaft bearing member is provided such that the shaft is inserted through the shaft bearing member in a manner slidable therein in a a forward and backward direction, the shaft bearing member being fixed at the floor side. Thus, when a forward or backward jolting or load is applied to the seat, the upper bracket fixed thereto is slidable elastically on the shaft bearing member fixed at the floor side, whereupon the seat is slidable forwardly and backwardly relative to the floor, and due to the resiliency of the coil springs, the jolting or load is absorbed, to thereby reduce the forward and backward impact on an occupant on the seat.

However, the foregoing prior arts have been found not complete in designing to absorb any practical force components of such forward and backward jolting or load. In other words, they are merely constructed to absorb a straight forward and backward load, and in practical use, a straight forward and backward load is not always applied to the seat, and most frequently, the forward and backward load is applied from various angles to the seat, and therefore, the load is not applied in a direction coaxially of the foregoing horizontal shaft, but applied obliquely thereto. Consequently, the horizontal shaft is strongly abutted against the shaft bearing member, causing a great friction therebetween to prevent the sliding movement of the horizontal shaft, or deforming the horizontal shaft per se, resulting in no sliding action thereof within the shaft bearing member. As such, a sufficient absorption of the forward/backward load or jolting is in no way attained.

SUMMARY OF THE INVENTION

The present invention is made with a view to eliminating the above-mentioned drawbacks inherent in prior arts, and it is therefore a purpose of the invention to provide an improved fore-and-aft suspension device for an automotive seat which acts positively in response to a forward and backward load or jolting and ensures to absorb such load or jolting, reducing an impact therefrom.

In achieving this purpose, in accordance with the present invention, the lateral bar section of a seat lower base frame of the seat is movable within a guide rail of a channel shape in section, via rollers provided rotatably on the seat lower base frame, so that the seat is movable forwardly and backwardly along the longitudinal direction of the guide rail. Further, the guide rail is fixed on the floor of automobile and has a spring abutment member provided therein, and on that lateral bar section of the lower base frame, a horizontal shaft is secured, with a pair of spaced-apart coil springs being wound loosely therearound. The horizontal shaft extends within the guide rail, passing through the spring abutment member, and the two coil springs are disposed on the opposite sides of the spring abutment member, such that the opposed ends of the springs are abutted on both sides of the spring abutment member while the other ends of them are secured respectively at both end portions of the horizontal shaft.

Accordingly, when a forward and backward load or jolting is applied to the seat, the seat lower base frame is moved via the rollers along the guide rail in a forward and backward direction, and therefore, such load or jolting, even if it is applied from somewhat varied angle to the seat, is transmitted in a linear manner by virtue of the rollers and guide rail to the two coil springs. In other words, the angularly applied fore-and-aft load or jolting is smoothly transformed into a linearly applied one by virtue of the straight-line movability of the seat lower base frame along the guide rail, and such linearly adjusted load or jolting causes the forward and backward movements of both seat lower base frame and horizontal shaft, and as the horizontal shaft is moved in its longitudinal axial direction through the spring abutment member, either of the two opposing coil springs are compressed at the spring abutment member, giving a repercussive force against the seat lower base frame, thereby absorbing the forward and backward load or jolting in a positive way.

DETAILED DESCRIPTION OF PREFERRED EMBODIMENTS OF THE INVENTION

Figure 1:
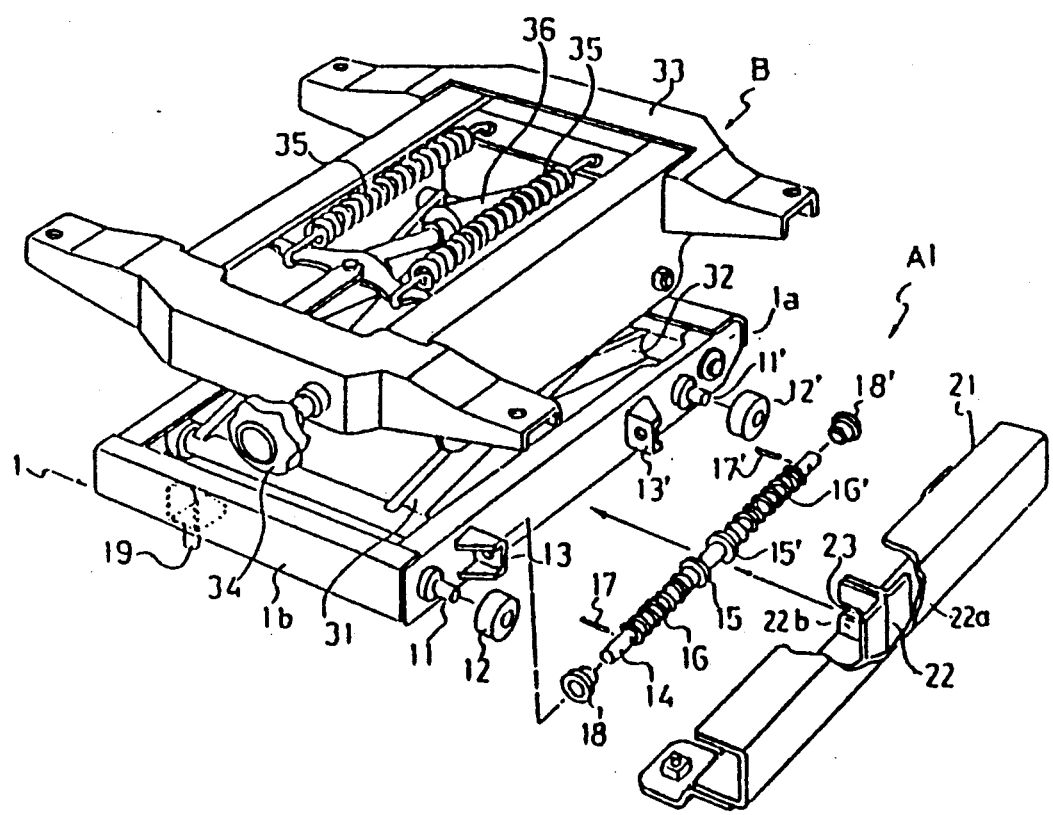
FIG. 1 is a partially broken perspective view of a fore-and-aft suspension device in accordance with the present invention.

Referring firstly to FIG. 1, generally illustrated is a fore-and-aft suspension device (A1) in accordance with the present invention, which is, in this particular embodiment, provided on an ordinary seat suspension device (B) of a vertically operable type. The latter suspension device (B) has a seat upper frame (33) and a seat lower base frame (1), with X-shaped links (31)(32) interposed between those two frames (33)(31).

Figure 3:
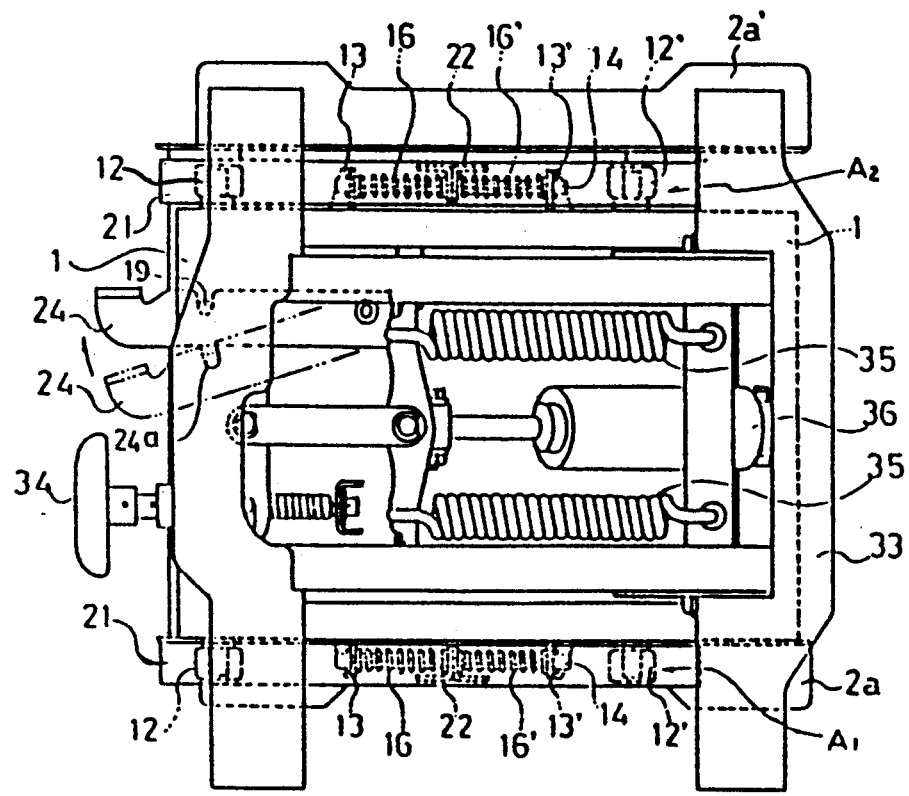
FIG. 3 is a plan view of the same device.
Figure 4:
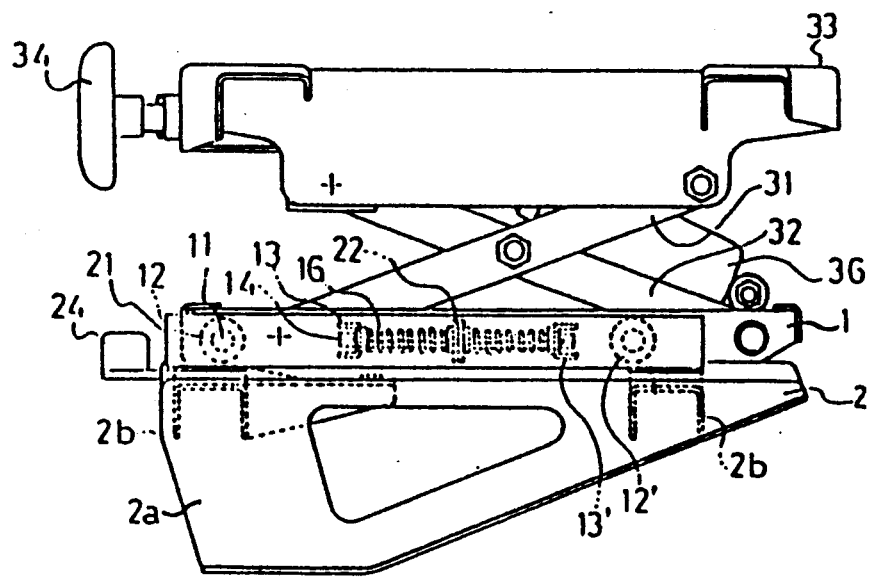
FIG. 4 is a side view of the same device.

As seen from FIG. 3, it is preferable that there are a pair of the fore-and-aft suspension devices (A1)(A2), and in the present embodiment, each of them is arranged at the respective lateral frame sections (1a)(1a') of the seat lower base frame (1).

Specific description will now be made only of fore-and-aft suspension device (A1) disposed at the right-side lateral bar section (1a), since both suspension devices (A1)(A2) are similar in structure to each other. As best shown in FIG. 1, a pair of spaced-apart axles (11)(11') are welded on the surface of the lateral frame section (1a) of the seat lower base frame (1), such that the one (11) and the other (11') are respectively disposed at the forward and rearward portions of the lateral frame section (1a). lo each of the axles (11)(11'), rotatably secured are a pair of rollers (12)(12'), respectively. Between the two rollers (12)(12'), a pair of first and second support brackets (13)(13') are fixed on the surface of the lateral frame section (1a) in a spaced-apart relation with each other, and each of the support brackets (13)(13') has a hole perforated therein, as shown. Designation (14) refers to a horizontal shaft which is extended between the two securing brackets (13)(13'), such that one end of the shaft (14) is inserted through the hole of the first support bracket (13) and the other end thereof is inserted through the hole of the second support bracket (13'), whereby the horizontal shaft extends along the longitudinal direction of the lateral frame section (1a) in parallel therewith. Further, as illustrated, around the horizontal shaft (14), a pair of spaced-apart first and second coil springs (16)(16') are wound in a loose or idle state, and also, around the same horizontal shaft (14), a pair of first and second annular slide pieces (15)(15') are slidably in such a manner that they are disposed generally at the midway point of the horizontal shaft (14) and slidable in the axial direction of the shaft (14).

The above-stated horizontal shaft (14) is at its both ends inserted through the respective holes of the first and second support brackets (13)(13') via collar members (18)(18') and fixedly secured to the respective brackets (13)(13') by means of pins (17)(17'), as shown. In this connection, it is noted that the first coil spring (16) is at its one end abutted against the first support bracket (13) and at its other end abutted against the first annular slide piece (15), while the second coil spring (16') is at its one end abutted against the second support bracket (13') and at its other end abutted against the second annular piece (15'). But, such abutment arrangement between the springs (16)(16') and brackets (13)(13') as well as annular slide pieces (15)(15') is not mandatory, and the springs (16)(16') may be secured to the brackets (13)(13') and annular slide pieces (15)(15'), respectively.

Figure 5:
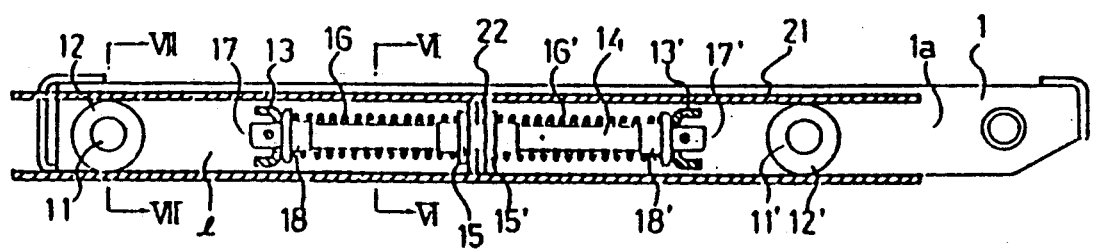
FIG. 5 is a sectional view of a principal part of the present invention.
Figure 6:
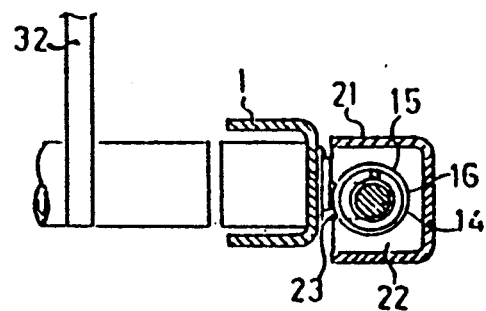
FIG. 6 is a sectional view taken along the line V—V in the 5.
Figure 7:
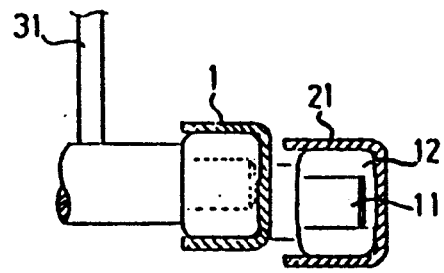
FIG. 7 is a sectional view taken along the line VI—VI in the FIG. 5.

Designation (21) represents a guide rail of a a channel shape in section, which is constructed such that its interior is relatively larger than the outer diameters respectively of the two rollers (12)(12') and dimensioned such as to receive the entirety of the rollers (12)(12'), as best seen in FIGS. 5 and 6, thereby defining a roller passageway (l) in the guide rail (21), allowing the rollers (12)(12') to roll in the passageway (l) in the longitudinal direction of the guide rail (21). In the interior of the guide rail (21), a spring abutment member (22) is provided such that it is disposed generally at the midway point of the guide rail (21). The spring abutment member (22) is formed by welding together a pair of L-shaped plate members so as to have ⊥-shaped configuration, comprising a flat base portion (22a), and a vertical portion (22b). The vertical portion (22b) of the spring abutment member (22) is dimensioned so as to expand and fill its area in the cross-section of the interior of the guide rail (21), serving as a compartment wall in the guide rail (21). Such vertical portion (22b) is formed with a cut-away recessed portion (23) therein, which is larger than the outer diameter of the horizontal shaft (14), but smaller than the outer diameter of the first and second annular slide pieces (15)(15'). as best seen in FIG. 7. Accordingly, the two rollers (12)(12') are fitted rotatably within the interior of the guide rail (21), and the horizontal shaft (14) extends through the cut-away recessed portion (23) associated with the spring abutment member (22), with the first and second annular slide pieces (15) (15') being biased by the respective first and second coil springs (16)(16') into abutment against both sides of the vertical portion (22b) of the spring abutment member (22), whereupon it is seen that the first and second coil springs (16)(16') are abutted against and spaced apart from each other at the spring abutment member (22), and the horizontal shaft (14) passes through the cut-away recessed portion (23) with no contact therebetween, as best understandable from FIG. 5.

Figure 2:
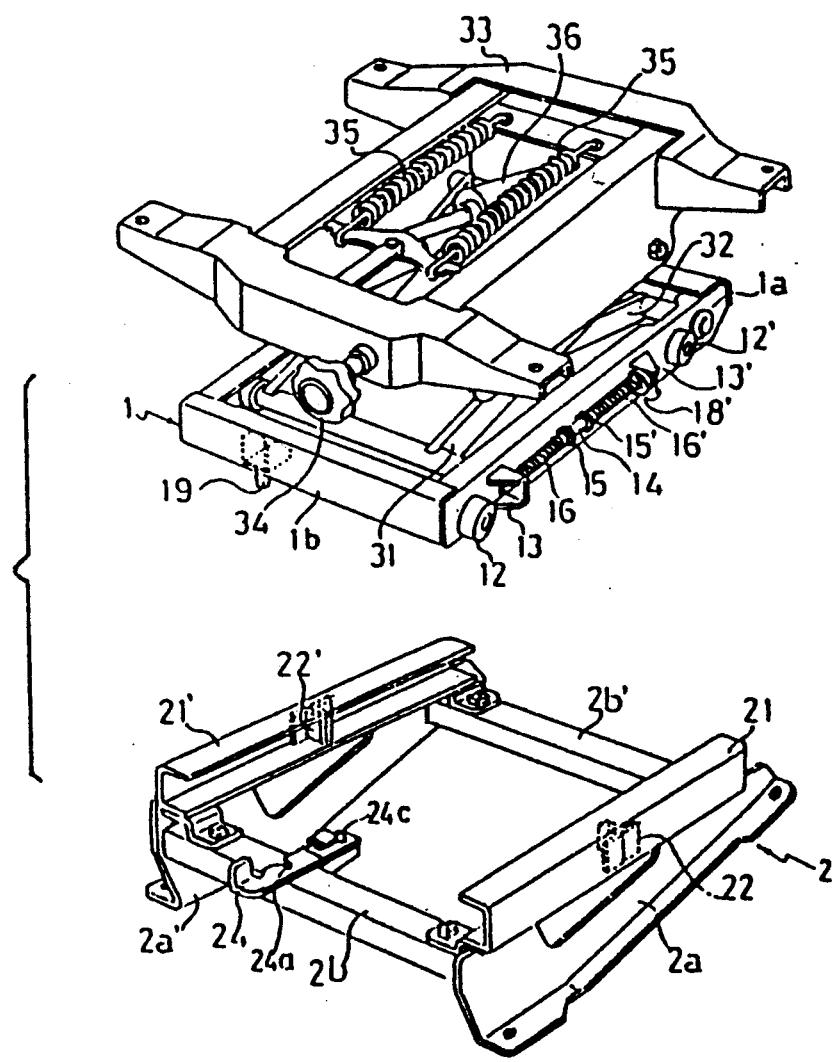
FIG. 2 is a perspective view of a framework adjacent the fore-and-aft suspension device, showing the state in which a seat lower base frame is separated from a guide rail.

As shown in FIG. 2, the above-mentioned guide rail (21) is fixed on the lateral frame section (2a) of a lower support frame (2), such that the opened portion of the guide rail (21) is oriented inwardly of the lower support frame (2), and it is observed that another guide rail (21') identical in structure to the foregoing one (21) is provided on the other lateral frame section (2a') of the lower support frame (2), and that the opened portions of both guide rails (21)(21') faces towards each other.

As shown in FIG. 2, a lock pin (19) is provided at the forward frame section (1b) of the seat lower base frame (1) in a manner dependent therefrom, and a rearward portion of a lock lever (24) is pivoted at the forward frame section (2b) of the lower support frame (2), the lock lever (24) being rotatable about the pivot point (24c) and having a notch (24a) formed therein for receipt of the lock pin (19). This constitutes a locking mechanism for locking or unlocking the above-described fore-and-aft suspension devices (A1)(A2). In operation, as illustrated in FIG. 3, when it is desired to lock the fore-and-aft suspension devices (A1)(A2), the lock lever (24) is rotated in the arrow direction so that the lock pin (19) is engaged into the notch (24a), and on the contrary, for unlocking the devices (A1)(A2), the lock lever (24) is rotated towards the position shown in the phantom line, so as to disengage the locking pin (19) from the notch (24a).

As regards the aforementioned seat suspension device (B), it is constructed in such a known arrangement wherein the seat uPPer frame (33) is elastically urged upwardly by means of a pair of tension springs (35) and the elasticity is adjusted by the rotation of the operation knob (34), with a shock absorber (36) provided between the seat upper frame (33) and seat lower base frame (1). Specific description is omitted in this respect, in view of its being of a well-known art state nature.

With the present invention constructed as above, it is seen that, when a forward and backward load or jolting is applied to the seat, the seat lower base frame (I) Is caused thereby to move along the guide rail (21) in the corresponding forward and backward direction by virtue of the rolling of the rollers (12)(12') within the guide rail (21), and at the same time, the horizontal shaft (14) secured at the seat lower base frame (1) is also moved in the same forward and backward direction along its axial direction, passing through the cut-away recessed portion (23) of the spring abutment member (22). At this state, when a forward load component out of the forward-and-backward load or jolting is being exerted upon the seat, the lower seat base frame (1) is moved forwardly and thus the second support bracket (13') fixed thereon is brought close to the spring abutment member (22), compressing the second coil spring (16') which then gives a repercussive force by its resiliency against the forward load component and absorbs it. On the other hand, when a backward load component out of the forward-and-backward laod or jolting is being exerted on the seat, the lower seat base frame is then moved backwardly, with the first support bracket (13) being brought close to the spring abutment (22), compressing the first coil spring (16) which gives a repercussive force against the backward load component and absorb it. In this way, the forward and backward load or jolting is transmitted positively via the fore-and-aft movability of both seat lower base frame (1) and horizontal shaft (14) along the guide rail (21) and applied to the first and second coil springs (16) (16'). Then, the springs (16)(16') absorb the forward and backward load or jolting in a perfect way, and reduces an impact therefrom with much efficiency.

Although not shown, it may be arranged that the first and second annular slide pieces (15)(15') are respectively secured to the adjacent ends of the first and second coil springs (16)(16'), whereby both first and second coil springs (16)(16') cooperate to absorb the forward and backward load or jolting in contrast to the above-descrIbed embodIment. The point in this regard is that, when a forward load component out of the forward-and-backward load or jolting is being exerted upon the seat, the seat lower base frame (1) is moved forwardly, and the first support bracket (13) compresses the first coil spring (16) towards the spring abutment member (22) while at the same time, the second support bracket (13') expands the second coil spring (16') from the spring abutment member (22). Accordingly, it is appreciated that the first coil spring (16) produces an expanding repercussive force and the second coil spring (16') produces a contracting repercussive force, and therefore, those two repecussive forces are directed in the same direction, thereby providing a twice as much the repercussive force against the forward load components. The same goes for a backward load component out of the forward-and-backward load or jolting. Such another embodiment is effective in increasing the spring force and retaining the seat in a central position more positively.

From the above description, it is apparent that the present invention is endowed with the undermentioned advantageous effects:

(1) By the reason of the seat lower base frame (1) being movable forwardly and backwardly along the guide rail (21), a forward and backward load or jolting, even if it is applied from somewhat varied angles to the seat, is transmitted in a linear manner with much smoothness to the coil springs (16)(16'). In other words, the angularly applied fore-and-aft load or jolting is smoothly transformed into a linearly applied one by virtue of the straight-line movability of the seat lower base frame (1) along the guide rail (21), and such linearly adjusted load or jolting causes the forward and backward movements of both seat lower base frame (1) and horizontal shaft (14), whereupon either of the two opposing coil springs (16)(16') is compressed at the spring abutment member (21), giving a repercussive force against the seat lower base frame (1), thereby absorbing the forward and backward load or jolting in a far more positive manner. This avoids the deformation of the horizontal shaft (14) or the frames (1, 21), as found in the above-mentioned prior arts.

(2) All the mechanic elements such as the rollers (12)(12'), brackets (13)(13'), horizontal shaft (14), coil springs (16)(16'), and so forth are incorporated collectively within the guide rail (21) and at the lateral frame section (1a) of the seat lower base frame (1). Thus, any parts of the fore-and-aft suspension devices (A1)(A2) are not exposed externally into view, and the frames of the seat can be formed in a thin or small structure, which leads to the great reduction of the seat weight.

While having described the present invention hereinbefore, it should be understood that the invention is not limited to the illustrated embodiment but other various modifications, replacements and additions may structurally be possible without departing from the spirit and scope of the appended claims for the invention. For example, the guide rails (21) may be so formed that its opened portions are oriented upwardly, thereby providing a generally U-shaped guide rail, and all the above-mentioned principal parts (12, 12', 13, 13', 14, 15, 15', 16, 16') may be provided on the bottom surface of the lateral frame section (1a) of the seat lower base frame (1), so that the seat lower base frame (1) may be movable on the guide rail (21) in its longitudinal direction. Or, the guide rail (21) may be formed at the lateral portion of the seat lower base frame (1) and the principal parts (12, 12', 13, 13', 14, 15, 15', 16, 16') are provided at the lower support frame (2).

Finally, while the description on the other fore-and-aft suspension device (A2) is omitted, its parts and elements shown in the drawings are similar to those of the above-described device (A1) or formed in a manner symmetrically as against the the latter, and the above-noted modifications can also apply in that other device (A2).

What is claimed is:

1. A fore-and-aft suspension device for an automotive seat, in which said seat includes a seat lower base frame, said fore-and-aft suspension device comprising:

support means fixed on the side of a floor of an automobile, said support means being arranged so as to extend along a longitudinal direction of said seat lower base frame, and supports said seat lower base frame, said support means comprising a pair of guide rails of a channel shape in section having opened portions extending longitudinally thereof, disposed such that the respective opened portions thereof face toward each other, one of said guide rails being disposed at one side of said seat lower base frame and the other of said guide rails being disposed at the other of said seat lower base frame;

movable means provided at said seat lower base frame, said movable means being adapted to permit forward-and-backward movement of said seat lower base frame along said support means, said movable means comprising at least two pairs of rollers, wherein one pair of said rollers is rotatably provided at one side of said seat lower base frame and the other pair of said rollers is rotatably provided at the other side of said seat lower base frame so that said at least two pairs of rollers are respectively disposed within said pair of guide rails in a rollable manner;

at least one shaft provided at said seat lower base frame, such that said shaft extends between said seat lower base frame and said support means;

at least one pair of coil springs wound around said at least one shaft; and at least one spring abutment member provided at said support means, in an opposite relation with said at least one shaft, such that said at least one spring abutment member extends towards said at least one shaft, spacing apart the coil springs of said at least one pair of coil springs from each other, so that the coil springs are at their respective ends abutted against said at least one spring abutment member, wherein said at least one shaft with said at least one pair of coil springs wound therearound comprises two shafts provided at both sides of said seat lower base frame and two pairs of coils springs wound around a respective shaft, and wherein said at least one spring abutment member comprises one spring abutment member provided in each of said pair of guide rails, and said at least one shaft, around which said at least one pair of coil springs are wound, is disposed within respective ones of said guide rails, whereby, when a forward and backward load or jolting is applied to said seat, said seat lower base frame is moved along said support means, and each of said coil springs is compressed at said spring abutment member, giving a repercussive force against said forward and backward load or jolting, thereby absorbing same.

2. The fore-and-aft suspension device according to claim 1, wherein on each side of said lower base frame, said shaft is at both ends thereof fixedly secured to first and second support brackets respectively, first and second annular slide pieces are slideably attached about said shaft such that they are disposed generally at a mid-way point of said shaft and a slideable along said shaft in its axial direction, said spring abutment member extends generally towards said midway point of said shaft, so that said spring abutment member is interposed between said first and second annular slide pieces, and one of the coil springs of said pair of coil springs is interposed between said first support bracket and said first annular slide piece, and the other coil spring of said pair of coil springs is interposed between said second support bracket and said second annular slide piece.

3. The fore-and-aft suspension device according to claim 1, wherein said at least one spring abutment member has a cutway recessed portion formed therein, through which said shaft passes.

4. The fore-and-aft suspension device according to claim 1, wherein there is further provided a locking device mechanism for locking and unlocking said fore-and-aft suspension device, said locking device mechanism including a lock pin provided at one of said seat lower base frame and said floor side, and a lock lever which is rotatably, pivotally provided at the other of said seat lower base frame and said floor side, said lock lever having a notch formed therein, whereby rotation of said lock lever causes engagement and disengagement of said lock pin into and from said notch of said lock lever, to thereby effect locking and unlocking of said fore-and-aft suspension device.

5. The fore-and-aft suspension device according to claim 1, wherein a vertically movable seat suspension device is provided on said seat lower base frame.

* * * * *